United States Patent [19]

Bailey

[11] Patent Number: 5,592,455
[45] Date of Patent: Jan. 7, 1997

[54] SYSTEM FOR RECORDING DIGITAL INFORMATION IN A PULSE-LENGTH MODULATION FORMAT

[75] Inventor: Jack H. Bailey, Villa Park, Calif.

[73] Assignee: DiscoVision Associates, Irvine, Calif.

[21] Appl. No.: 245,558

[22] Filed: May 18, 1994

Related U.S. Application Data

[62] Division of Ser. No. 180,312, Jan. 12, 1994, Pat. No. 5,373,490, which is a continuation of Ser. No. 75,275, Jun. 11, 1993, Pat. No. 5,321,680, which is a continuation of Ser. No. 948,267, Sep. 21, 1992, Pat. No. 5,253,244, which is a continuation of Ser. No. 825,640, Jan. 24, 1992, abandoned, which is a continuation of Ser. No. 645,638, Jan. 25, 1991, Pat. No. 5,084,852, which is a continuation of Ser. No. 499,217, Mar. 16, 1990, Pat. No. 5,003,526, which is a continuation of Ser. No. 782,156, Oct. 2, 1985, abandoned, which is a continuation of Ser. No. 169,238, Jul. 16, 1980, abandoned.

[51] Int. Cl.$^6$ ........................................................ G11B 7/00
[52] U.S. Cl. ................................... 369/59; 369/54; 369/58; 369/47; 369/275.4
[58] Field of Search ............................ 360/32, 39, 33.1; 369/59, 111, 124, 125, 54, 58, 47, 109, 275.4; 358/261, 335, 342, 459

[56] References Cited

U.S. PATENT DOCUMENTS

| | | |
|---|---|---|
| 563,148 | 6/1896 | Essick . |
| 1,364,078 | 1/1921 | Crehore . |
| 2,887,674 | 5/1953 | Greene . |
| 3,226,685 | 12/1965 | Potter et al. . |
| 3,281,806 | 10/1966 | Lawrence . |
| 3,414,894 | 12/1968 | Jacoby . |
| 3,587,090 | 6/1971 | Labeyrie . |
| 3,624,637 | 11/1971 | Irwin . |
| 3,639,899 | 9/1972 | Franaszek . |
| 3,701,846 | 10/1972 | Zenzefilis . |
| 3,996,613 | 12/1976 | Manning et al. . |
| 4,020,282 | 4/1977 | Halpern . |
| 4,022,986 | 5/1977 | Teer . |
| 4,041,530 | 8/1977 | Kramer et al. . |
| 4,094,013 | 6/1978 | Hill . |
| 4,161,753 | 7/1979 | Bailey et al. . |
| 4,210,931 | 7/1980 | Bailey et al. . |
| 4,222,072 | 9/1980 | Bailey et al. . |
| 4,238,843 | 12/1980 | Carasso et al. . |
| 4,349,901 | 9/1982 | Howe . |
| 4,371,894 | 2/1983 | Camras . |
| 4,491,940 | 1/1985 | Tinet . |
| 4,500,484 | 2/1985 | Gregg . |
| 5,253,244 | 10/1993 | Bailey ........................................ 369/59 |
| 5,321,680 | 6/1994 | Bailey ........................................ 369/59 |

FOREIGN PATENT DOCUMENTS

| | | |
|---|---|---|
| 346921 | 12/1978 | Austria . |
| 2343017 | 8/1973 | Germany . |
| 50-62563 | 5/1975 | Japan . |
| 52-128024 | 10/1977 | Japan . |
| 54-80726 | 6/1979 | Japan . |
| 644432 | 10/1950 | United Kingdom . |
| 1382515 | 2/1975 | United Kingdom . |
| 1489774 | 10/1977 | United Kingdom . |
| 1570799 | 7/1980 | United Kingdom . |

OTHER PUBLICATIONS

Patel, A. M.; Charge–Constrained Byte–Oriented (0,3) Code; IBM Technical Disclosure Bulletin; vol. 19, No. 7, Dec. 1976, pp. 2715–2717.

Sony Es Review 1979, vol., 34 (Annex 1), English translation (Annex 1A).

(List continued on next page.)

Primary Examiner—Georgia Y. Epps
Assistant Examiner—Muhammad N. Edun
Attorney, Agent, or Firm—Steptoe & Johnson LLP

[57] ABSTRACT

An improved system for recording and playing back digital information in a special pulse-length modulation format on a disc-shaped record. The digital information is stored in a succession of alternating marks and spaces, both having lengths that are discretely variable in accordance with a succession of multi-bit binary code blocks.

6 Claims, 2 Drawing Sheets

OTHER PUBLICATIONS

Doi, et al. "A Long Play Digital Audio Disc System", Sony Audio Technology Ctr., Tokyo, Japan, Presented in Brussels, Belgium 1979 (Annex 2).

"Development of PCM Audio Disc System for Long PLay of Two and Half Hours on One Side", Showa 53, Oct. 5th, Sony Corporation Press Release (Annex 3 and 3A) Year N/A.

Annex 4: Japanese newspaper, Oct. 6, 1978.

Annex 5: Japanese newspaper, Oct. 6, 1978.

Annex 6: extracted copy of "Stero Technic" of Japanese Magazine, Dec. 1978.

Annex 7: "PCM Audio Disc System", published on Electronics of Japanese magazine, p. 1219, Dec. 1978.

Annex 8: DAD–1X, Sony brochure Date N/A.

Annex 9: extracted copy of Billboard, Nov. 18, 1978.

Annex 10: Sony Es Review, vol. 34, 1979.

Annex 11: English translation of Japanese article "PCM Audio Disc (Record) Player", on Television Society, pp. 1–21.

Annex 12: "A system of Optical Digital Audio Disc".

Ogawa et al., Sony Technical Report of IECE, #EA7–8–27 (Jul. 1978).

Sato et al., "Pulse Interval and Width Modulation for Video Transmission", IEEE Transactions on Cable Television, vol. CATV–3, No. 4, Oct. 1978, pp. 165–173.

"Audio 2–Channel Transmission Experiment By Pulse: Internal–Width Modulation Method", Pre–document of Lecture for National convention of Television Association in 1979; (pub. Jul. 1, 1979); pp. 171–172 (6–12), original and translation.

"Multi–level Transmission by Pulse Interval and Width Modulation Code", Technical Research Report of Electronic Communication Assoc. Technical Rpt; vol. 78, No. 188; (pub. Dec. 12, 1978); pp. 19–24 (c.s. 78–163), original and translation.

"Pulse Interval and Width Modulation for Video Transmission", Technical Research Report of Electronic Communication Association; Tech. Rpt. vol. 77, No. 239; (pub. Feb. 20, 1978); pp. 15–21 (c.s. 77–173), original and translation.

"Audio Transmission Experiment by Pulse Interval Width Modulation Code", Pre–document of Lecture for National covention of Television Association in 1979; (pub. Jul. 1, 1979); pp. 175–176 (6–14), original and translation.

Ogawa et al. "A system of Optical Digital Audio Disc", Extraction from Technical Research Report of Electronic Communication Assoc.; Tech. Rpt. vol. 78, No. 93; (pub. Jul. 25, 1978); pp. 19–24 (EA78–27), original and translation.

Yamazaki, Yoshio "PCM Audio Recording", Dept. of Science & Technology, (Waseda University); Magazine of Television Association; vol. 33, No. 1, 1979; pp. 2–10 and 26–31, original and translation.

Horiguchi et al., "An Optimization of Modulation Codes In Digital Recording", IEEE Transactions on Magnetics, vol. MAG–12, No. 6, Nov. 1976, pp. 740–742.

Gallo, Luigi, "Signal System Design for a Digital Video Recording System", SMPTE Journal, Oct. 1977, vol. 86, pp. 749–756.

Patel, Arvind M., "New Method for Magnetic Encoding Combines Advantages of Older Techniques", Computer Design, Aug. 1976, pp. 85–91.

"3–2 Modulating Method", Japanese article, and translation Date N/A.

Heemskerk et al., "Compact Disc: System Aspects And Modulation", Phillips Tech. Rev, 40, No. 6, 1982, pp. 157–164.

| CODE BLOCK | HEXADECIMAL EQUIVALENT | MARK (OR SPACE) LENGTH |
|---|---|---|
| 0000 | 0 | 1.0L |
| 0001 | 1 | 1.1L |
| 0010 | 2 | 1.2L |
| 0011 | 3 | 1.3L |
| 0100 | 4 | 1.4L |
| 0101 | 5 | 1.5L |
| 0110 | 6 | 1.6L |
| 0111 | 7 | 1.7L |
| 1000 | 8 | 1.8L |
| 1001 | 9 | 1.9L |
| 1010 | A | 2.0L |
| 1011 | B | 2.1L |
| 1100 | C | 2.2L |
| 1101 | D | 2.3L |
| 1110 | E | 2.4L |
| 1111 | F | 2.5L |

SYSTEM FOR RECORDING DIGITAL INFORMATION IN A PULSE-LENGTH MODULATION FORMAT

This is a division of application Ser. No. 08/180,312 filed Jan. 12, 1994, U.S. Pat. No. 5,373,490, which is a continuation of 08/075,275, filed Jun. 11, 1993, now U.S. Pat. No. 5,321,680; which is a continuation of Ser. No. 07/948,267 filed Sept. 21, 1992, U.S. Pat. No. 5,253,244; which is a continuation of Ser. No. 07/825,640 filed Jan. 24, 1992, abandoned; which is a continuation Ser. No. 07/645,638 filed Jan. 25, 1991, U.S. Pat. No. 5,084,852; which is a continuation of Ser. No. 07/499,217filed Mar. 16, 1990, U.S. Pat. No. 5,003,526; which is a continuation of Ser. No. 06/782,156 filed Oct. 2, 1985, abandoned; which is a continuation of Ser. No. 06/169,238 filed Jul. 16, 1980, abandoned.

BACKGROUND OF THE INVENTION

This invention relates generally to systems for storing digital information, and, more particularly, to video disc systems for storing digital information in a pulse-length modulation format.

Video disc systems are becoming widely used for storing digital information with a high recording efficiency. The information is ordinarily recorded on the disc as a succession of spaced marks arranged in a plurality of substantially circular and concentric recording tracks, for example, a spiral pattern. One particularly efficient system has recorded the digital information in a pulse-length modulation format, in which each of the successive spaced marks has a discretely-variable length representative of a separate, multi-bit code block. The spacing between successive marks, or alternatively the spacing between the beginning edges of successive marks, is ordinarily maintained constant.

The vide disc can include a glass substrate, with a thin. metallic recording layer overlaying it and apparatus for recording the digital information on the disc ordinarily focuses a writing beam of light onto the disc, as the disc is rotated at a uniform rate, with the intensity of the beam being modulated in accordance with the digital information to be recorded. When the intensity exceeds a predetermined threshold, a non-reflective pit or mark is formed in the recording layer, whereas when the intensity does not exceed the threshold, the recording layer is not affected. Thus, the lengths of the successive, spaced marks correspond to the time duration the intensity of the focused beam exceeds this threshold.

The recorded digital information is recovered from replicas of the recorded video disc by scanning it with a reading beam of light having a uniform intensity, to produce a reflected beam having an intensity modulated by the recorded pattern of spaced marks. The length of time the intensity of the reflected beam exceeds a predetermined level is then measured to determine the length of the corresponding mark and thus the particular binary code block it represents.

Although this prior pulse-length modulation technique has proven effective in recording digital information with a relatively high recording efficiency, there is still a need for a system for recording digital information with an even higher efficiency. The present invention fulfills this need.

SUMMARY OF THE INVENTION

The present invention is embodied in a system for recording and playing back digital information on a record medium, in which the information is stored in a succession of spaced marks of discretely-variable lengths. The length of each mark is representative of a separate one of a succession of multi-bit binary code blocks. In accordance with the invention, the spaces between successive marks also have discretely-variable lengths representative of separate blocks in the succession of code blocks. Digital information is thereby recorded on the record medium with a yet higher recording efficiency.

More particularly, the present invention has particular utility in a video disc system in which a video signal is recorded on a disc-shaped record in a succession of substantially circular and concentric recording tracks. The recording apparatus functions initially to digitize the video signal and to compress the digitized signal, using known data compression techniques. The digitized signal is then arranged in a succession of code blocks of the same or mixed lengths, and a binary modulation signal is formed having transitions in state determined in accordance with the successive code blocks. In the preferred embodiment, each code block includes four binary bits, and the successive states of the modulation signal have sixteen possible discrete durations.

The modulation signal is coupled to a light intensity modulator, which modulates the intensity of a writing beam such that the intensity is alternately greater than and less than a predetermined threshold for time durations corresponding to the succession of multi-bit code blocks. The intensity-modulated beam is focused onto the record, as the record is rotated at a prescribed rate, to form corresponding microscopic pits or marks in a prescribed pattern. Using conventional techniques, the record can then be used to produce video disc replicas.

The recorded digital information is played back from disc replicas by scanning the successive tracks with a reading beam of light having a substantially uniform intensity. This produces a reflected (or transmitted) beam having an intensity modulated by the recorded pattern of alternating marks and spaces. The playback apparatus measures the time durations of the successive marks and spaces and determines the particular code blocks each represents. After de-compressing the succession of detected code blocks, the original analog video signal can be re-created.

In-the preferred embodiment, each of the successive recording tracks is used to record a separate video frame. Since the special pulse-length modulation format results in a recorded pattern of marks and spaces having a variable length, however, it is usually the case that less than an entire track is required to record each video frame. When this occurs, the remainder of the track is occupied by alternating marks and spaces representative of a prescribed filler code.

Other aspects and advantages of the present invention will become apparent from the following description of the preferred embodiment, taken in conjunction with the accompanying drawings, which disclose, by way of example, the principles of the invention.

DESCRIPTION OF THE PREFERRED EMBODIMENT

Figure 1:
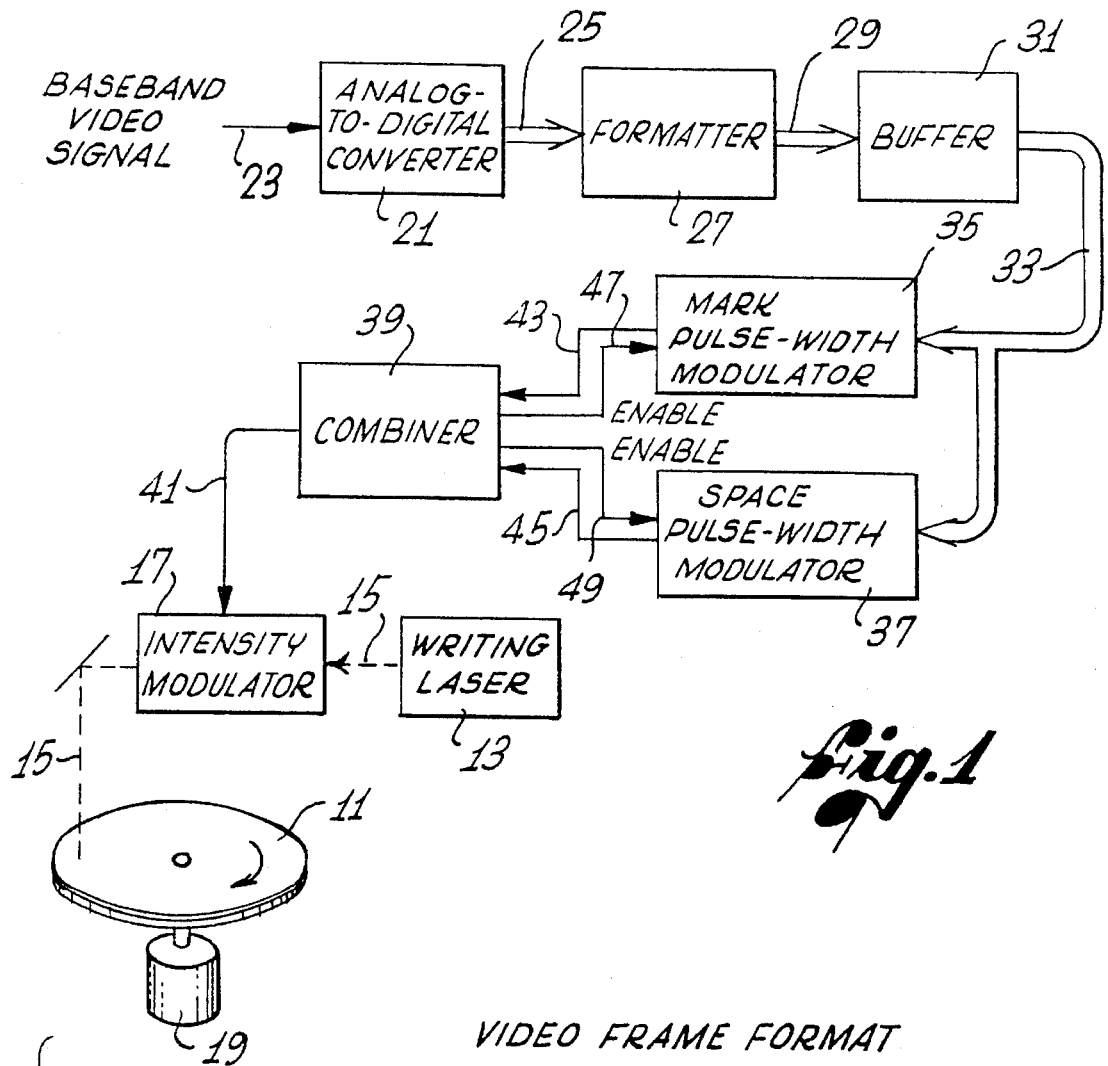
FIG. 1 is a simplified block diagram of recording apparatus in accordance with the present invention, for recording a digitized video signal on a video disc, in a special pulse-length modulation format.

Referring now to the drawings, and particularly to FIG. 1, there is shown recording apparatus for recording a digitized video signal on a disc-shaped record 11. The apparatus includes a writing laser 13 for producing a writing beam of light 15 having a substantially uniform intensity, and an intensity modulater 17 for modulating the intensity of the beam in accordance with a digital modulation signal to be recorded. The apparatus further includes a radially-movably objective lens (not shown) for focusing the intensity-modulated beam onto the record, and a spindle motor 19 for rotating the record at a prescribed, uniform rate (e.g., 1800 r.p.m.). The focused beam thereby forms a succession of substantially circular and concentric recording tracks in the record.

The record 11 includes a glass substrate with a metallic recording layer overlaying it, and the focused beam forms a microscopic pit in the recording layer whenever its intensity exceeds a predetermined threshold. The intensity is modulated to be alternately greater and less than this threshold, in accordance with the digital modulation signal to be recorded, so that a corresponding succession of spaced pits or marks is formed in the record.

In accordance with the invention, the digitized video signal is recorded in the record 11 in a special pulse-length modulation format, in which both the successive marks and the spaces between successive marks have discretely-variable lengths representative of a succession of multi-bit binary code blocks. Digital information is thereby recorded on the record with an improved recording efficiency.

More particularly, the recording apparatus of FIG. 1 includes an analog-to-digital converter 21, for sampling a baseband video signal input on line 23 and converting it to a corresponding digital signal. This digital signal is coupled over lines 25 to a formatter 27, for removal of vertical and horizontal sync signals, compression of the digital information, and formatting of the compressed data into successive four-bit code blocks. These successive code blocks are transfered over lines 29 to a suitable storage buffer 31, which outputs the blocks, one by one over lines 33, to a MARK pulse-width modulator 35 and a SPACE pulse-width modulator 37. The two pulse-width modulators operate, in an alternating fashion, to produce output pulses having discretely-variable time durations corresponding to the particular code blocks applied to their respective input terminals. The buffer 31 must have sufficient storage capacity to store a predetermined number of 4-bit code blocks, since the blocks are input at a substantially uniform rate but are output at a variable rate determined by the particular information the code blocks contain.

Figures 2, 4:
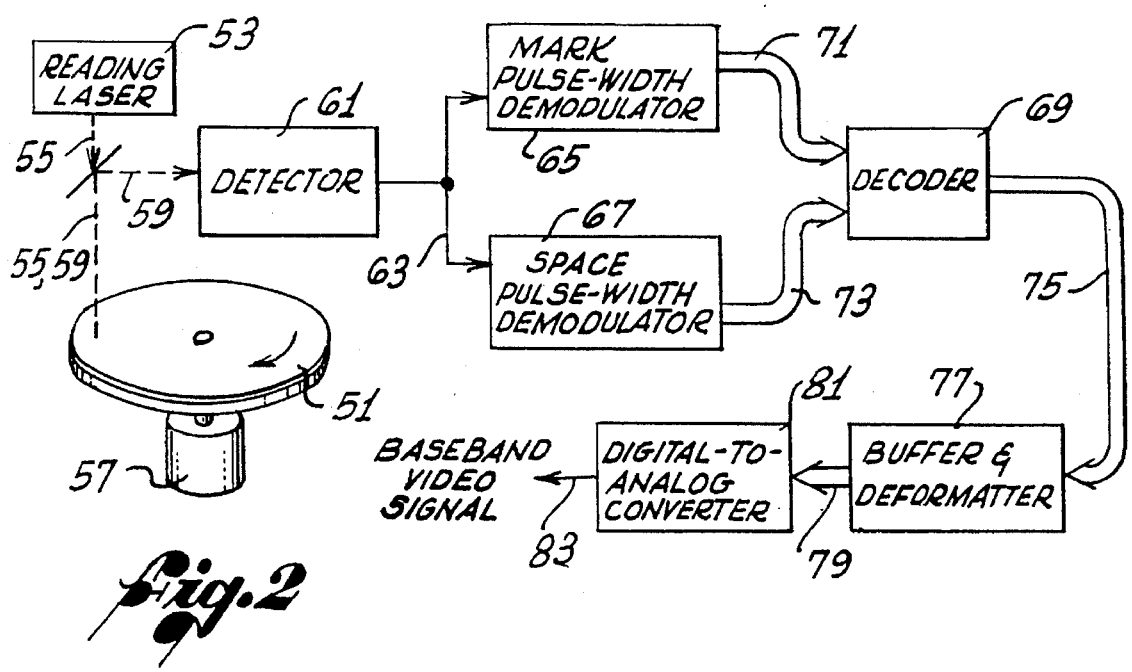
FIG. 2 is a simplified block diagram of playback apparatus in accordance with the present invention, for recovering the digitized video signal stored on the video disc in the special pulse-length modulation format.
FIG. 4 is a table showing the prescribed lengths for the sucessive marks (and spaces) corresponding to each of the plurality of possible 4-bit code blocks being recorded.

FIG. 4 is a table showing one suitable relationship between the sixteen possible 4-bit code blocks and the time durations for the corresponding pulses output by the two pulse-width modulators 35 and 37. It will be observed that the possible pulse lengths vary in uniform steps between a minimum length of 1.0 L and a maximum length of 2.5 L. An alternative relationship between the sixteen possible code blocks and the corresponding pulse durations is provided in a copending and commonly-assigned application for U.S. Pat. Ser. No. 974,183, filed in the name of Jack H. Bailey and entitled "Video Player/Recorder With Non-Linear Mark Length Modulation".

The recording apparatus of FIG. 1 further includes a combiner device 39 for producing the modulation signal coupled over line 41 to the intensity modulator 17, in accordance with the successive pulse-length modulated pulses received over lines 43 and 45 from the MARK and SPACE modulators 35 and 37, respectively. The combiner also controls the timing of the MARK and SPACE modulators by providing ENABLE signals over lines 47 and 49, respectively, initiating operation of each modulator immediately after the previous output pulse from the other modulator has terminated. The modulation signal output by the combiner on line 41 is in a logical "one" state whenever the MARK modulator 35 outputs a pulse, and in the logical "zero" state whenever the SPACE modulator 37 outputs a pulse. The desired pattern of alternating marks and spaces, representative of the successive four-bit code blocks, is thereby formed in the record 11.

Figure 3:
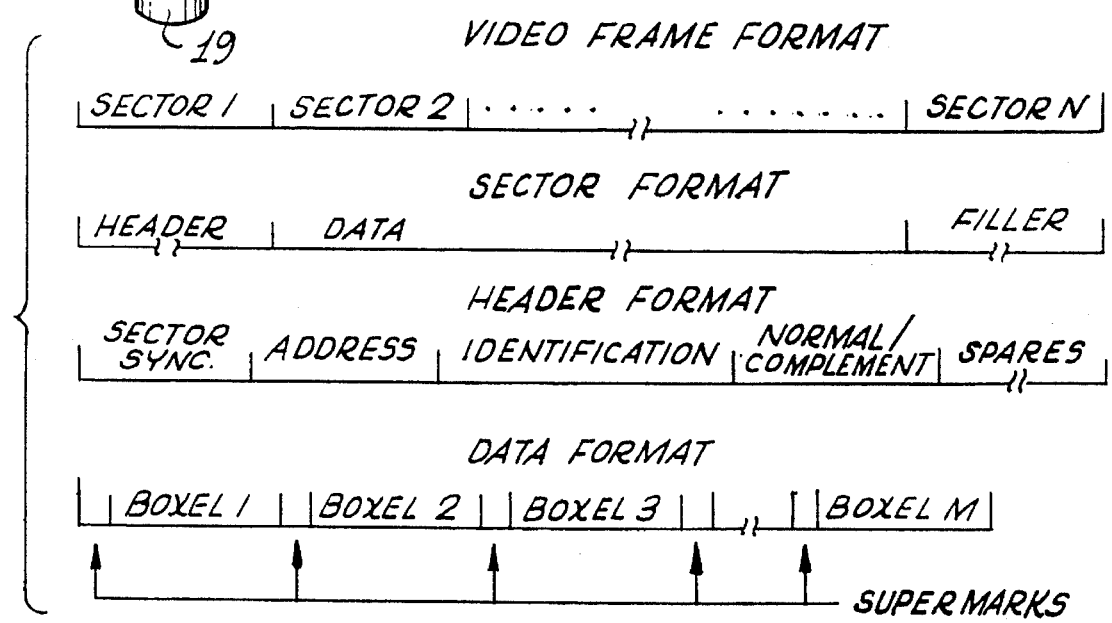
FIG. 3 is a schematic diagram illustrating the format of the data on the video disc.

In the preferred embodiment, each of the successive recording tracks in the record 11 records the digital information for a single video frame. As shown in FIG. 3, each track includes N sectors, and each sector includes a header portion, a data portion, and a filler portion of variable length. A fixed amount of data is included in each data portion, but since each mark and space are variable in length, the length of the entire data portion is likewise variable. The filler portion is therefore usually necessary. In the preferred embodiment, the filler code comprises a special sequence of marks and spaces that can be used in calibrating apparatus for playing back the recorded information. Both the header and filler portions of each sector are generated by the formatter 27 (FIG. 1), which includes registers for storing data representative of the current frame and sector number and of the particular location in the sector currently being recorded.

FIG. 3 depicts the header portion of each sector to include a synchronizing code, a sector address code, an identification code indicating the character of the data (e.g., video, audio, etc.), a normal/complement code, and spares for permitting expansion of any of the previous codes. The normal/complement code is used as a special means for minimizing the length of the data in each sector. As previously mentioned, each sector includes a fixed amount of data, but is variable in length, in accordance with the particular code blocks being recorded. If it is determined by the formatter 27 (FIG. 1) that the required track length to record a particular sector of data exceeds a predetermined average value, then the formatter outputs the complement of each code block for recording instead, and modifies the normal/complement code in the corresponding header, accordingly. In this manner, the maximum track length required to store the data in any sector corresponds to the recording of marks and spaces that are all of average length, i.e., that correspond to the code blocks "0111" or "1000".

FIG. 3 also depicts the format of the data portion of each sector. It will be observed that the data includes M successive boxels, each preceded by a special supermark code, for synchronization and re-initialization. In the preferred embodiment, each boxel corresponds to an 8×8 matrix derived from a segment of the video frame.

FIG. 2 depicts apparatus for playing back a video disc replica 51 of the recorded record 11 of FIG. 1. The apparatus includes a reading laser 53 for producing a reading beam of light 55 having a substantially uniform intensity. This beam is focused onto the disc 51 by a radially-movable lens (not shown) as the disc is rotated at a uniform rate by a spindle motor 57. This produces a reflected beam 59 that is modulated in intensity in accordance with the recorded pattern of marks on the disc. The apparatus then detects the modulated beam and measures the lengths of the successive pulse-length modulated marks and spaces, to determine the corresponding 4-bit code blocks they represent. The original baseband video signal is thereafter reconstructed.

More particularly, the playback apparatus of FIG. 2 includes a detector 61 for detecting the modulated intensity of the reflected beam 59 and producing a corresponding electrical signal. This signal is coupled over line 63 to a MARK pulse-width demodulator 65 and a SPACE pulse-width demodulator 67, which measure the lengths of the successive marks and spaces, respectively, and determine the particular code blocks they represent. Each demodulator can conveniently include a linear ramp generator that is initiated and terminated by the detected edges of each mark (or space), along with an analog-to-digital converter for converting the peak value of the ramp to the corresponding four-bit code block. The apparatus further includes a decoder 69 for interleaving the successive four-bit code blocks supplied on lines 71 and 73 from the MARK and SPACE demodulators 65 and 67, respectively.

The sequence of code blocks is coupled over lines 75 from the decoder 69 to a buffer and deformatter device 77, which de-compresses the data using conventional techniques, converting it back to substantially its original digital format. Additionally, the deformatter inserts conventional digitized vertical and horizontal sync signals into the decompressed video data. The deformatter then produces a real-time digital video signal for coupling over lines 79 to a digital-to-analog converter 81, which reconstructs the original analog baseband video signal for output on line 83. The buffer and deformatter device 77 must include sufficient memory capacity to store a predetermined portion of the successive incoming code blocks, which are received from the decoder 69 at a variable rate determined by on the particular information the codeblocks contain, while the information is being output in a substantially real-time fashion.

It will be appreciated from the foregoing description that the present invention provides an improved system for recording and playing back digital information on a disc-shaped record. The information is stored in a succession of spaced marks, with the lengths of both the marks and the spaces between successive marks being discretely variable in accordance with a succession of multi-bit code blocks. The digital information is thereby stored with an improved recording efficiency.

Although the present invention has been described in detail with reference to its presently preferred embodiment, it will be understood by those of ordinary skill in the art that various modifications can be made without departing from the spirit and scope of the invention. Accordingly, it is not intended that the invention be limited, except as by the appended claims.

I claim:

1. A method of reading digital information from an optical disc comprising the steps of:

reading a succession of alternating marks and spaces recorded on the optical disc and generating a corresponding succession of playback signals indicative thereof;

recognizing each of the marks and spaces when they have a length no less than a minimum length and no greater than a maximum length, the maximum length being greater than double the minimum length;

recognizing length differences between a first length of any mark or space and a second length of any other mark or space which are less than said minimum length; and converting the succession of recognized marks and spaces into a succession of binary bits indicative of the digital information represented by the recognized marks and spaces in accordance with the recognized length difference, by decoding each portion of the succession of playback signals using only a first decoding operation to decode each portion of the succession of playback signals into a portion of the succession of binary bits and no operation, subsequent to the first decoding operation, which processes the portion of the succession of binary bits, each decoded portion being a final code indicative of each corresponding portion of the succession of playback signals.

2. A method as in claim 1, wherein said minimum length is a value 1, said maximum length is a value greater than 21, and said length difference is a value 0.11.

3. A method of reading digital information from an optical disc comprising the steps of:

reading a succession of alternating marks and spaces recorded on the optical disc and generating a corresponding succession of playback signals indicative thereof;

recognizing each of the marks and spaces when they have a length no less than a minimum length and no greater than a maximum length, the maximum length being greater than double the minimum length, and recognizing differences in length between a first length of any mark or space and a second length of any other mark or space which is less than said minimum length;

dividing said succession of marks and spaces into a succession of playback signal portions of a predetermined length and decoding said succession of playback signal portions into a succession of decoded portions using a decoding system whereby every said playback signal portion decodes into a decoded portion which unambiguously represents said every playback signal portion, said decoding obtaining said decoded portion without additional information about portions other than the portion being decoded; and using the succession of decoded portions as the digital information.

4. A method as in claim 3 comprising the further steps of:

decompressing said succession of binary bits from said using step to produce a succession of original binary bits; and receiving the succession of original binary bits and generating an analog signal representative of a succession of original binary bits.

5. A method as in claim 3 wherein each said portion of said succession of binary bits includes the same number of binary bits.

6. A method of reading digital information from an optical disc comprising the steps of:

reading a succession of alternating marks and spaces recorded on the optical disc and generating a corresponding succession of playback signals indicative thereof;

recognizing each of the marks and spaces when they have a length no less than a minimum length and no greater than a maximum length, the maximum length being greater than double the minimum length, and recognizing differences in length between a first length of any mark or space and a second length of any other mark or space which are less than said minimum length;

dividing said succession of marks and spaces into a succession of playback signal portions of a predetermined length;

decoding each said portion into a decoded portion based only on said each portion and not on a previous or subsequent portion; and using the succession of decoded portions as the digital information.

* * * * *